United States Patent
Mayer

[15] 3,682,017
[45] Aug. 8, 1972

[54] BALANCED CYLINDRICAL COIL FOR AN ELECTRICAL MACHINE

[72] Inventor: Jurgen Mayer, Sachseln, Switzerland

[73] Assignee: Interelectric AG, Sachseln, Switzerland

[22] Filed: Feb. 19, 1971

[21] Appl. No.: 116,945

[30] Foreign Application Priority Data

Feb. 20, 1970 Austria ..........................1583

[52] U.S. Cl. ......................74/573, 310/265, 29/598
[51] Int. Cl. ...........................................F16f 15/22
[58] Field of Search........310/208, 261, 266, 43, 265, 310/45, 264; 74/5, 573; 29/598, 605

[56] References Cited

UNITED STATES PATENTS

| | | |
|---|---|---|
| 3,312,847 | 4/1967 | Waclaw......................310/43 |
| 2,206,472 | 7/1940 | Taylor..........................74/573 |
| 2,461,773 | 2/1949 | Reid.............................74/573 |
| 3,456,512 | 7/1969 | Schmidt...........................74/5 |
| 3,488,837 | 1/1970 | Massouda..................310/266 |

Primary Examiner—J. D. Miller
Assistant Examiner—R. Skudy
Attorney—Frederick E. Bartholy

[57] ABSTRACT

An ironless cylindrical coil-rotor for electrical machines which is balanced by attached weights is described. These weights consist of foil strips which are fastened to the surface of the turns of the coil-rotor and are at least partially embedded in the interspaces of the coil turns in order to achieve a flat structure of the balanced coil-rotor and a strong anchorage of the foil strips to the coil-rotor. The foil strips are made of a plastically deformable material.

8 Claims, 4 Drawing Figures

BALANCED CYLINDRICAL COIL FOR AN ELECTRICAL MACHINE

BACKGROUND AND OBJECTS

This invention concerns a balanced cylindrical coil winding for an electrical machine, and more particularly for a small direct current motor or direct current generator, in which the cylindrical coil forms the rotor which does not contain any ferromagnetic parts.

Such balanced cylindrical coils are difficult in production since they do not have any portions of material which may be excavated for balancing the coil. The higher the speed of the rotating coil, the more important is the balancing. In conventional designs of electrical machines, whose rotors contain a relatively large quantity of iron, balancing is carried out by local removal of iron.

Attempts have already been made to balance ironless rotors which are made in cylindrical or conical form as self-supporting coils by adding definite weights of a plastic material which is fixed on the coil by adhesion and thereafter is cured. However, such balanced coils have proved to be unsatisfactory for use in small electrical machines since the mass of the plastic material materially increases the thickness of the cylindrical coil and thus affords a greater air gap of the magnet structure.

It is an object of the present invention to provide a balanced cylindrical coil which is easy in production and does not afford a greater air gap.

It is a further object of the invention to provide a balanced cylindrical coil for electrical machines having a bell-shaped and ironless cylindrical rotor which is void of material that may be excavated for balancing the rotor.

SUMMARY OF THE INVENTION

According to the invention a cylindrical coil for use as an ironless rotor of an electrical machine has affixed to its outer or inner cylindrical surface of the coil foil plates which form the balancing weights. These foil plates or strips are at least partially embedded in the interspaces of the turns of the coil and thus do not materially increase the thickness of the same. Since the foil plates or strips may be of uniform thickness and width the weight of a unit length of the same is constant. Thus, the measured balance weight may be achieved by cutting a definite length of that foil plate or strip instead of weighing the same, which is more time consuming.

According to one embodiment the foil strips are applied to the inner surface of the rotor foil. Thus, the foil strips cannot be thrown away by centrifugal forces.

According to a further feature of the invention, the foil strip is coated with an adhesive on one of the surfaces in order to facilitate affixing of the foil strips to the rotor coil.

BRIEF DESCRIPTION OF THE DRAWINGS

The invention will be described in greater detail hereinafter with reference to an embodiment illustrated in the accompanying drawing in which.

DETAILED DESCRIPTION OF THE INVENTION

Figure 1:
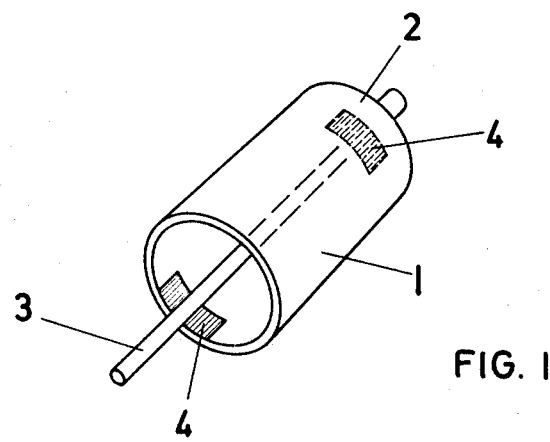
FIG. 1 is a perspective view of a bell-shaped ironless cylindrical coil for electrical machines comprising lead foil strips pressed onto the inner surface.

The cylindrical coil illustrated in FIG. 1 includes a bell-shaped winding region 1 which is secured at one end of its end faces to an end plate 2 mounted on a shaft 3. The taps (not illustrated) of the winding 1 are disposed in the region of the end plate 2 and are connected to a commutator (not shown).

In the vicinity of the end edges of the winding 1 are strip-shaped lead foil pieces or plates 4 which are pressed into the spaces between the turns of the winding 1 and secured by means of adhesive. Due to the plastic deformability of lead the lead strips 4 easily penetrate into the cavities between the turns 6 of the winding 1 and consequently the winding thickness of the cylindrical coil remains practically the same. To press on the lead foil pieces the cylindrical coil is placed with the loosely applied lead strips between cylindrical press plates to avoid changing the shape of the cylindrical coil. Such clamping and pressing means are known per se and do not form part of the subject of the invention.

Figure 2:
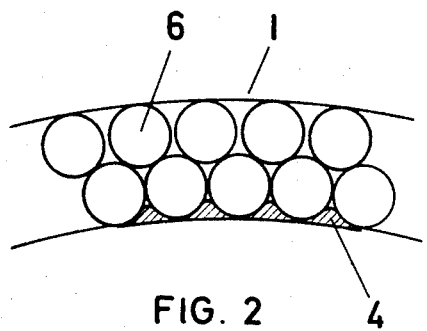
FIG. 2 is a partial section through the cylindrical coil of FIG. 1 in a plane diametrically intersecting a lead foil strip.
Figure 4:
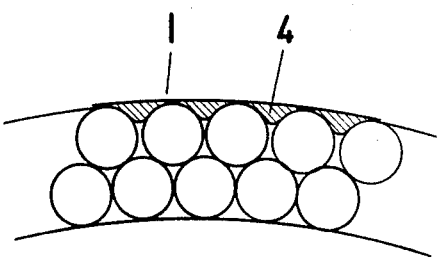
FIG. 4 is a partial section of FIG. 3 in a plane diametrically intersecting a lead foil strip.
Figure 3:
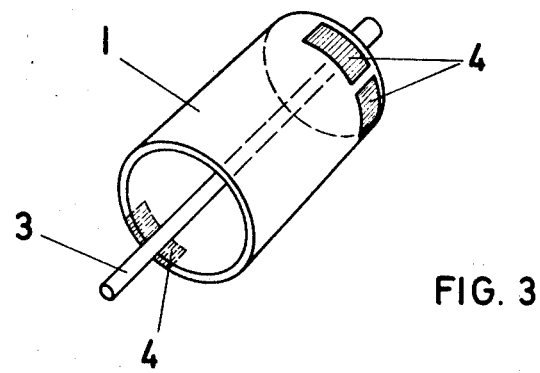
FIG. 3 is a perspective view of a bell-shaped ironless cylindrical coil having lead foil strips pressed onto the outer surface.

FIG. 3 shows a further cylindrical coil in which the lead strip 4 is applied to the outer surface of the winding 1. It is seen from FIG. 4 that the lead strip has been deformed by the pressing onto the winding and as a result most of the lead is disposed in the spaces between the turns 6 of the winding and the thickness of the cylindrical coil is practically unchanged.

If lead strips are used which extend over a substantial portion of the periphery of the cylindrical coil of the length of the latter account must be taken of the fact that the center of gravity of such a lead strip lies inside the cylindrical coil, i.e. at a point remote from the edges thereof. The mass necessary to compensate for the unbalance must therefore be made correspondingly higher. However, no difficulties are encountered in taking such a correction into account in practice.

It is within the scope of the invention to use instead of lead another material which is more easily deformed by pressure than the material of the wire from which the cylindrical coil is made.

I claim:

1. An ironless cylindrical coil-rotor for electrical machines and balanced by attached weights, wherein the weights consist of foil strips which are secured symmetrically to the determined unbalance position on at least one of the surfaces of the cylindrical coil and which are at least partially embedded in the interspaces of the coil turns, and wherein the foil strips are made of plastically deformable material.

2. A cylindrical coil as claimed in claim 1, wherein the foil strips are applied to the inner surface of the cylindrical coil.

3. A cylindrical coil as claimed in claim 1, wherein the foil strips are coated on one of their surfaces with an adhesive.

4. A cylindrical coil according to claim 1, wherein the foil strips consist of a material of high specific weight and low electrical conductance.

5. An ironless cylindrical coil-rotor for electrical machines and balanced by attached weights, wherein said weights consist of foil plates of a material of high specific weight and low electrical conductance which are secured to the surface of the cylindrical coil such that the center of gravity of said foil strips coincides with a corresponding measured unbalance position and which are at least partially embedded in the interspaces of the turns of the cylindrical coil.

6. A cylindrical coil according to claim 5, wherein the foil strips consist of plastic-bonded metal.

7. A cylindrical coil according to claim 5, wherein the plastic component of the plastic-bonded metal is thermosetting.

8. A cylindrical coil as claimed in claim 5, wherein the foil strips consist of lead.

* * * * *